United States Patent [19]

Huffhines et al.

[11] Patent Number: 4,465,094
[45] Date of Patent: Aug. 14, 1984

[54] COMPRESSED AIR DISTRIBUTION SYSTEM

[75] Inventors: Donald F. Huffhines, Richardson; Robert E. Roach, Duncanville, both of Tex.

[73] Assignee: Mobil Oil Corporation, New York, N.Y.

[21] Appl. No.: 339,240

[22] Filed: Jan. 13, 1982

[51] Int. Cl.$^3$ .............................................. F17D 1/00
[52] U.S. Cl. ................................ 137/557; 137/883; 181/110
[58] Field of Search ................. 137/557, 883; 181/110

[56] References Cited

U.S. PATENT DOCUMENTS

| | | | |
|---|---|---|---|
| 582,769 | 5/1897 | Wank | 137/883 |
| 2,275,608 | 3/1942 | Brisbane | 137/883 |
| 2,288,297 | 6/1942 | Naiman | 137/883 |
| 3,516,638 | 6/1970 | Piggott | 137/883 |
| 3,709,248 | 1/1973 | Aurich et al. | 137/883 |
| 3,853,144 | 12/1974 | Whelan | 137/883 |
| 3,928,711 | 12/1975 | Jakobson | 137/883 |
| 4,034,827 | 7/1977 | Leerskov, Jr. et al. | 181/107 X |
| 4,136,450 | 1/1979 | Guenther et al. | 137/883 |
| 4,137,942 | 2/1979 | Hargraves et al. | 137/557 |
| 4,191,215 | 3/1980 | Gonner | 137/883 |
| 4,203,423 | 5/1980 | Ricci | 137/883 |
| 4,207,563 | 6/1980 | Soupal | 137/557 |

Primary Examiner—Alan Cohan
Assistant Examiner—John A. Rivell
Attorney, Agent, or Firm—A. J. McKillop; M. G. Gilman; F. J. Kowalski

[57] ABSTRACT

An apparatus is provided wherein one air supply is used to supply compressed air for a plurality of multi-size seismic pulse generators.

2 Claims, 3 Drawing Figures

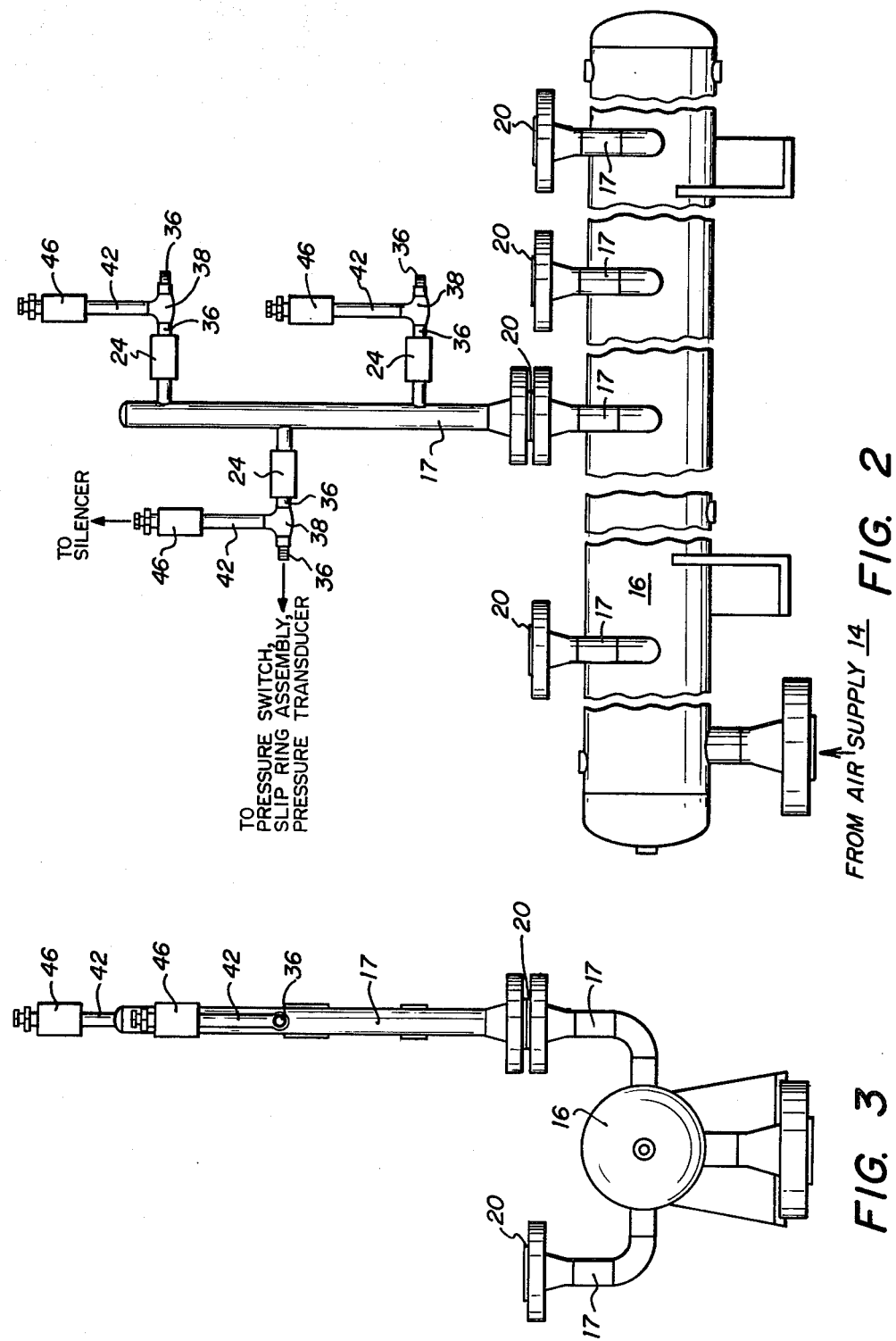

COMPRESSED AIR DISTRIBUTION SYSTEM

BACKGROUND OF THE INVENTION

The present invention pertains to marine seismic exploration and more particularly to marine seismic exploration using air guns as acoustic seismic pulse generators.

In present marine seismic exploration a marine vessel having seismic pulse generators and or used in conjunction with a plurality of acoustic pulse detectors is used. Normally, a string of air guns are towed behind the marine vessel and are used as seismic acoustic pulse generators. A line of acoustic pulse detectors, such as geophones, may also be towed behind the marine vessel or may be laid on the ocean floor.

The string of air guns may be fired simultaneously or sequentially and may be of varied sizes. An air gun may have pressure requirements from 100 PSI to 5000 PSI. Each air gun normally has its own high pressure hose connection to the marine vessel. For example a string of twenty air guns will have twenty high pressure air hoses coming in the stern of the marine vessel, connecting to a single air compressor or high pressure air source. Each air hose is a different length and is wound on a reel when not in use. During deployment of the air guns the air hoses are unwound from the reel while fluid coupling between the air base and the high pressure source must be maintained.

Prior art has taught several methods for maintaining fluid coupling, however, the present trend is to increase the number of air guns and the pressure at which the guns are operated. The increased pressure requirements have rendered previously used prior art methods inoperative. Furthermore, an increase in the number of air guns used normally requires that the entire system be replaced with a system with additional gun capability. Thus, the addition of a few air guns represent a high capital expenditure.

SUMMARY OF THE INVENTION

An apparatus for the distribution of a compressed fluid is disclosed wherein a reservoir or vessel is used to receive the compressed fluid from a high pressure air supply. Several major conduits are connected to the reservoir for initial distribution of the compressed fluid. A plurality of minor conduits are connected to each of the major conduits through electrically operated valves for distribution of the compressed fluid. Silencer connections may be connected to the minor conduits through electrically operated valves. The entire distribution apparatus is bolted together and retains a modular type of construction to permit rapid and inexpensive replacement of individual portions of the assembly.

BRIEF DESCRIPTIONS OF THE DRAWINGS

FIG. 2 is a side plan view of an air distribution system.

FIG. 3 is a front view of the apparatus of FIG. 2.

DESCRIPTION OF PREFERRED EMBODIMENT

Figure 1:
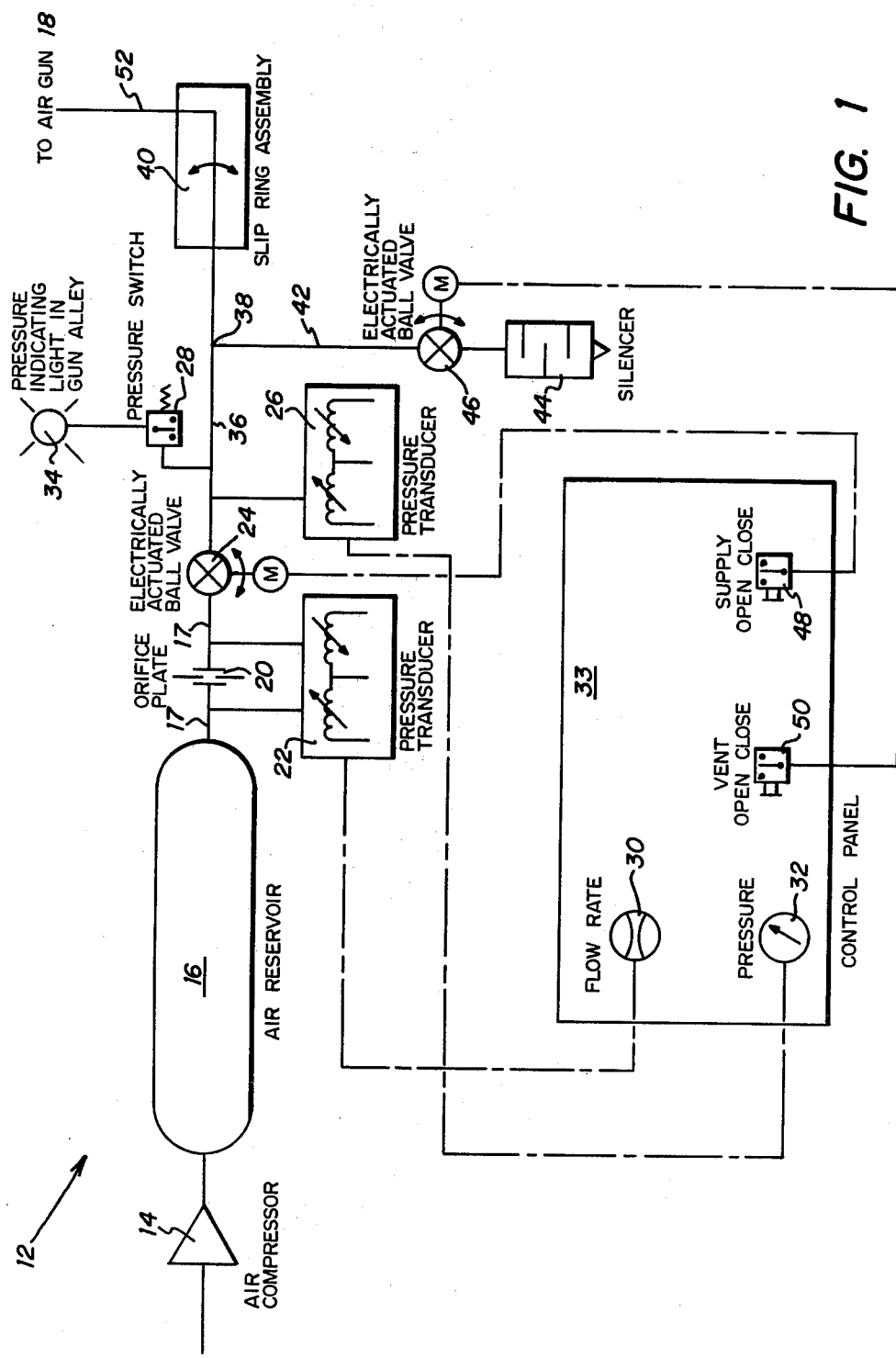
FIG. 1 is a partial block diagram of an air distribution system.

FIG. 1 is a partial block, partial seismatic diagram of an air supply systems 12 having an air compressor 14, reservoir 16 to supply compressed air to the air gun 18. Connected to air reservoir 16, is a major conduit 17 having orifice plate 20 connected therein and associated differential pressure transducer 22. Coupled to orifice plate 20 is an electrically operated ball valve 24 having a pressure transducer 26 and pressure switch 28 connected downstream. Differential pressure transducer 22 provides the input for the flow rate meter 30, pressure transducer 26 provides the input for a pressure meter 32 both located on control panel 33 and pressure switch 28 provides the signal for a pressure indicating light 34. A minor conduit or flow line 36, connected to electrically actuated ball valve 24, is bifurcated at point 38 with the main portion of the pressure line 36 feeding slip-ring assembly 40, and a vent line 42 feeding silencer 44 through electrically actuated ball valve 46. Electrically operated ball valve 24 is operated by control switch 48 and electrically actuated ball valve 46 is operated by control switch 50, both switches being located on control panel 33.

In operation air compressor 14 supplies compressed air up to 5000 psi to air reservoir 16. Reservoir 16 supplies line 17 through which differential pressure across orifice plate 20 indicates the flow rate therethrough. Slip-ring assembly 40 receives compressed air when electrically actuated ball valve 24 is open to permit fluid flow through minor conduit 36 to slip-ring assembly 40. Transducer 26 is connected into conduit 36 to detect the pressure therein which is indicated on pressure gauge 32 on control panel 33. A detailed description of Slip-ring assembly 40 is contained in copending patent application U.S. Ser. No. 332,134, titled "Slip-Ring Assembly". Assigned to a common assignee and which is incorporated herein by reference in its entirety. Electrically actuated ball valve 46 is opened to provide a vent for conduit 36 through ventline 42 to silencer 44, to reduce pressure in the downstream system. Compressed air through conduit 36 is supplied to air guns 18 through air hoses 52 which are connected to slip-ring assembly 40.

Referring now to FIG. 2, a side plan view of the distribution system of the present invention is illustrated. For simplicity, one complete assembly connected to reservoir 16 through conduit 17 is illustrated. Four conduit 17 connections with orifice plates 20 are illustrated, however, additional connections for conduit 17 maybe added to reservoir 16 depending on the total distribution capacity desired. Air supply 14 provides pressured compressed air to reservoir 16 for storage where it remains until air guns 18 (see FIG. 1) are actuated. Guns 18 may be actuated to opening electrically activated ball valve 24 which permits a flow of compressed air from reservoir 16 to flow through conduit 36. As discussed previously, a pressure vent through vent line 42 is permitted by opening electrically actuated ball valve 46 to silencer 44 whenever pressure in the system is to be reduced.

Referring now to FIG. 3 a front plan view of the apparatus of FIG. 2 is illustrated. As illustrated, reservoir 16 may have conduit 17 connections on two sides to permit a total capability, of supporting twenty four air hoses 52 with eight major conduits 17 receiving an air supply from reservoir 16. Each of the major conduits 17 may have three or more conduits 36 attached thereto. Thus, a total capability of supplying 24 or more air guns 18 simultaneously is achieved.

While the present invention has been illustrated by way of preferred embodiment, it is to be understood the invention is not to be limited thereto but only by the scope of the appended claims.

We claim:

1. An air distribution system for use in an acoustic seismic exploration system with a high pressure air supply comprising:

reservoir means for receiving high pressure compressed air from one source;

a plurality of major conduit means connected to said reservoir means for removal of a portion of said high pressure compressed air;

a plurality of minor conduit means each connected to said major conduit means through a first electrically operated valve for simultaneously distributing said portion of said high pressure compressed air;

a plurality of second electrically operated valves, connected to each of said minor conduit means to control pressure of said compressed air therein; and vent means connected to each of said minor conduit means through said second electrically operated valve;

a plurality of acoustic air guns, each connected to one of said minor conduit means.

2. The air distribution system of claim 1 also including:

flow detecting means connected in said major conduit means for detecting fluid flow therethrough.

* * * * *